(12) United States Patent
Hiller et al.

(10) Patent No.: US 12,338,970 B2
(45) Date of Patent: Jun. 24, 2025

(54) LIGHTING DEVICE FOR VEHICLES

(71) Applicant: Hella GmbH & Co. KGaA, Lippstadt (DE)

(72) Inventors: Lukas Hiller, Lippstadt (DE); Carsten Hohmann, Warstein (DE); Martin Mügge, Geseke (DE)

(73) Assignee: Hella GmbH & Co. KGaA, Lippstadt (DE)

( * ) Notice: Subject to any disclaimer, the term of this patent is extended or adjusted under 35 U.S.C. 154(b) by 0 days.

(21) Appl. No.: 18/637,117

(22) Filed: Apr. 16, 2024

(65) Prior Publication Data

US 2024/0360974 A1 Oct. 31, 2024

(30) Foreign Application Priority Data

Apr. 26, 2023 (DE) .......................... 102023110786.0

(51) Int. Cl.
*F21S 43/31* (2018.01)
*B60Q 1/00* (2006.01)
(Continued)

(52) U.S. Cl.
CPC ............ *F21S 43/31* (2018.01); *B60Q 1/0041* (2013.01); *B60Q 1/0088* (2013.01); *B60Q 1/22* (2013.01);
(Continued)

(58) Field of Classification Search
CPC ........ F21S 41/147; F21S 41/148; F21S 41/33; F21S 41/331; F21S 41/332; F21S 41/333; F21S 41/334; F21S 41/335; F21S 41/336; F21S 41/337; F21S 41/338; F21S 43/26; F21S 43/26251; G03H 2001/0469; G03H 2001/2231; G03H 2223/24;
(Continued)

(56) References Cited

U.S. PATENT DOCUMENTS

| 2007/0253219 A1* | 11/2007 | Kim | F21V 19/0055 362/612 |
| 2016/0200241 A1* | 7/2016 | Snider | B60Q 3/30 362/520 |

FOREIGN PATENT DOCUMENTS

| DE | 202005007501 U1 | 9/2005 |
| DE | 102021117908 A1 | 1/2023 |

(Continued)

OTHER PUBLICATIONS

Machine translation of WO 2018069792 A1 retrieved from the FIT database of PE2E search. (Year: 2024).*
(Continued)

*Primary Examiner* — Colin J Cattanach
(74) *Attorney, Agent, or Firm* — Husch Blackwell LLP

(57) ABSTRACT

A lighting device for vehicles includes a light source unit containing numerous light sources, and includes a hologram unit containing numerous hologram segments for generating a predefined light distribution. The hologram segments form reflection hologram segments behind and/or next to the light source unit in the main beam direction (H) of the lighting device, such that light emitted from the light source strikes the reflection hologram segment at an acute angle $\varphi$). Holographic diffraction information is stored in the reflection hologram segments for generating a signal light distribution. The light source unit contains just one printed circuit board or one printed circuit board substrate.

20 Claims, 9 Drawing Sheets

(51) Int. Cl.
    *B60Q 1/22*     (2006.01)
    *F21S 41/147*     (2018.01)
    *F21S 41/148*     (2018.01)
    *F21S 41/33*     (2018.01)
    *F21S 43/20*     (2018.01)
    *F21W 103/20*     (2018.01)
    *F21W 103/35*     (2018.01)
    *F21W 103/40*     (2018.01)
    *F21Y 107/90*     (2016.01)
    *G02B 27/09*     (2006.01)
    *G03H 1/04*     (2006.01)
    *G03H 1/22*     (2006.01)

(52) U.S. Cl.
CPC ......... *B60Q 2400/30* (2013.01); *F21S 41/147* (2018.01); *F21S 41/148* (2018.01); *F21S 41/33* (2018.01); *F21S 41/331* (2018.01); *F21S 41/332* (2018.01); *F21S 41/333* (2018.01); *F21S 41/334* (2018.01); *F21S 41/335* (2018.01); *F21S 41/336* (2018.01); *F21S 41/337* (2018.01); *F21S 41/338* (2018.01); *F21S 43/26251* (2024.05); *F21W 2103/20* (2018.01); *F21W 2103/35* (2018.01); *F21W 2103/40* (2018.01); *F21Y 2107/90* (2016.08); *G02B 27/0944* (2013.01); *G03H 2001/0469* (2013.01); *G03H 2001/2231* (2013.01); *G03H 2223/24* (2013.01); *G03H 2225/52* (2013.01); *G03H 2250/42* (2013.01)

(58) Field of Classification Search
CPC ........... G03H 2225/52; G03H 2250/42; G02B 27/0944; G02B 5/18–1895; F21Y 2107/90
See application file for complete search history.

(56) References Cited

FOREIGN PATENT DOCUMENTS

| | | | | |
|---|---|---|---|---|
| WO | WO-2004057382 A1 | * | 7/2004 | ........... G02B 5/1819 |
| WO | WO-2010054611 A1 | * | 5/2010 | ............... G03H 1/02 |
| WO | WO-2018069792 A1 | * | 4/2018 | ............. B60Q 1/302 |

OTHER PUBLICATIONS

Machine translation of WO 2010054611 A1 retrieved from the FIT database of PE2E search. (Year: 2024).*

Machine translation of WO 2004057382 A1 retrieved from the FIT database of PE2E search. (Year: 2024).*

* cited by examiner

LIGHTING DEVICE FOR VEHICLES

CROSS REFERENCE

This application claims priority to German Application No. 10 2023 110786.0, filed Apr. 26, 2023, the entirety of which is hereby incorporated by reference.

FIELD OF THE INVENTION

The invention relates to a lighting device for vehicles that has a light source unit containing a number of light sources, and a hologram unit containing a number of hologram segments for generating a predefined light distribution, in which the hologram segments are reflection hologram segments behind and/or adjacent to the light source unit in the main beam direction of the lighting device, such that the light emitted from the light sources strikes the reflection hologram segments at an acute angle, and holographic information for generating a signal light distribution is stored in each of the hologram segments.

BACKGROUND OF THE INVENTION

DE 10 2021 117 908 A1 discloses a lighting device for vehicles that has a light source unit containing numerous light sources and a hologram unit containing a number of hologram segments for generating a predefined light distribution. The hologram segments are reflection hologram segments with which light from the light sources can be deflected to a main beam direction of the lighting device. The reflection hologram segments are behind the light sources in the main beam direction. The light sources are concealed behind a horizontal screen with holes through which the light from the light sources strikes the respective hologram segments at an acute angle. The disadvantage with this lighting device is that because of the curvature of the adjacent hologram segments, the light sources must be at different directions to the hologram unit, such that it is relatively difficult to install the light sources.

BRIEF SUMMARY OF THE INVENTION

The object of the present invention is to create a lighting device for vehicles containing numerous hologram segments for generating a predefined light distribution with which different light distributions can be easily generated, and which is much easier to install.

The particular advantage with the invention is that the light source unit is relatively simple, because it only requires a single printed circuit board or a single printed circuit board substrate.

According to a preferred embodiment of the invention, the printed circuit board can be flat and have two sides, such that it can be populated with numerous light sources on both sides. The light sources are placed on both sides of the printed circuit board, corresponding to reflection hologram segments that contain diffraction information, such that light is reflected in the same main beam direction. Because the printed circuit board is aligned with the main beam direction, the light source unit can be concealed behind a relatively small screen.

According to one aspect of the invention, the printed circuit board substrate is V-shaped, such that it not only supports the light sources, but also functions as a screen. The light sources are concealed by the sides of the printed circuit board substrate meeting at an acute angle.

According to one aspect of the invention, a partial light distribution, or the entire light distribution, is generated by reflection at overlapping reflection hologram segments. The reflection hologram segments contain the same diffraction information over their respective surfaces, such that the reflection properties, and therefore the brightnesses of the corresponding partial light distributions vary at transitions from a first reflection hologram segment to an adjacent reflection hologram segment. At the transitions between two adjacent hologram segments there is a smooth transition in the reflection properties, such that the brightness throughout the resulting partial light distribution, or the light distribution, remains harmonious.

According to one aspect of the invention, the reflection hologram segments that meet at an obtuse angle have a single dedicated light source for generating a partial light distribution, or a light distribution. This advantageously minimizes the number of LEDs, and therefore the amount of electricity needed for the signal function. The reflection hologram segments are preferably integrally joined to one another, resulting in a faceted hologram reflector. Different partial light distributions are obtained with the reflection hologram segments, which are superimposed to obtain a light distribution forming a signal light distribution, e.g. for tail lights, brake lights, turning signals, daytime running lights, reversing lights, or rear fog lights.

According to one aspect of the invention, there are numerous hologram reflectors that are spaced apart from one another, each of which has exactly one dedicated light source. The hologram reflectors are preferably identical, such that the light output or intensity can be easily increased.

According to one aspect of the invention, the reflection hologram segment contains numerous subsidiary hologram elements that are preferably of the same size. These subsidiary hologram elements are relatively small, such that a pixeled reflection hologram segment is generated with dual light information. The subsidiary hologram element contains either diffraction information that reflects the light (bright), or diffraction information that does not reflect the light (dark). The reflection hologram segment is thus composed of numerous subsidiary hologram elements arranged in a matrix, which can generate graphics, symbols, or alphanumerical signals based on their diffraction information.

According to one aspect of the invention, the size of subsidiary hologram elements is in the millimeter range, e.g. 0.7 mm×0.7 mm. This results in a sufficiently high resolution for creating symbols or signals, etc. that are "ingrained" in the reflection hologram segment by corresponding diffraction information.

According to one aspect of the invention, the subsidiary hologram elements can be spaced apart, such that there is empty space between adjacent subsidiary hologram elements that contains no light information or reflective properties, thus generating a dark grid for the graphics or signals generated by the reflection hologram segment. A simple pattern can be advantageously generated therewith.

According to one aspect of the invention, the subsidiary hologram elements contain diffraction information resulting in a gradual dimming of the light distribution, or partial light distribution, toward the edges, such that the light fades out. It is assumed that the subsidiary hologram elements can contain a variety of diffraction information, such that pixels of different brightness are reflected. Advantageously, subsidiary hologram elements of different sizes can also be formed in this manner, such that the number of adjacent subsidiary hologram elements with the same diffraction information changes along one or more directions of the reflection hologram segment.

According to one aspect of the invention, the light sources each have focusing lenses with which differences in the directions of the main axes of the light sources and their reflection hologram segments can be compensated for. This means that the light sources can be placed on a single, flat printed circuit board, and their reflection hologram segments can be placed at different levels, or in different alignments to one another. The reflection hologram segments can be arranged on a planar or curved surface. The focusing lenses not only compensate for the differences in the angles of the main axes of the light sources to the main axes of the corresponding reflection hologram segments, but also collimate the light beams from the LED light sources, which, in accordance with Lambert's emission law, are relatively wide. This improves the effectiveness of the lighting device and reduces the power consumption of the light sources.

According to one aspect of the invention, the reflection hologram segment is glued, laminated, or bonded to a substrate. If the substrate is black, a black panel appearance can be obtained, such that the reflection hologram segment looks dark when the lighting device is switched off. The reflection hologram segments are preferably made of a film that can be securely applied to the substrate.

According to one aspect of the invention, the reflection hologram segment is in a housing and laminated or bonded to a substrate, the outer surface of which is then protected by a cover plate formed on the substrate in an injection molding process. The reflection hologram segment, preferably in the form of a film, is therefore reliably protected between two rigid components, preferably made of plastic.

BRIEF DESCRIPTION OF THE DRAWINGS

Reference is now made more particularly to the drawings, which illustrate the best presently known mode of carrying out the invention and wherein similar reference characters indicate the same parts throughout the views.

DETAILED DESCRIPTION OF THE DRAWINGS

Figure 1:
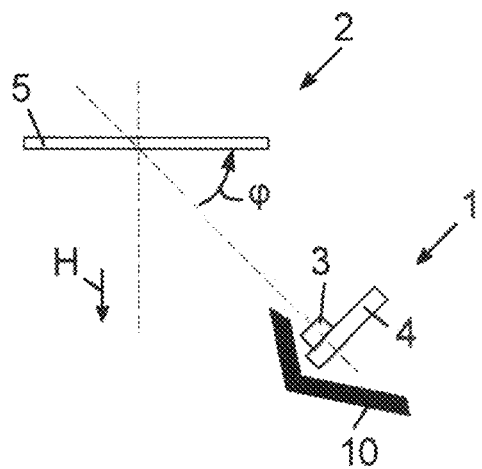
FIG. 1 shows a lighting device from above according to a first embodiment.

A lighting device for vehicles is shown in FIG. 1 that is used to generate a signal function. It is substantially composed of a light source unit 1 and a hologram unit 2. The light source unit 1 comprises a single light source 3 that is placed on a flat printed circuit board 4. The hologram unit is composed of a hologram element or hologram segment 5 forming a reflection hologram segment. Holographic diffraction information is stored in the reflection hologram segment 5, which results in light emitted from the light source 3, or light striking the reflection hologram segment 5 at an acute angle φ being deflected into the main beam direction H. In this exemplary embodiment, the light 6 emitted from the light source 3 strikes the surface of the reflection hologram segment 5 at an angle of 20° to 70°, preferably 30° to 50°. The main beam direction H is substantially perpendicular to the reflection hologram segment 5. A screen 10 for the light source unit 1 delimits the light emission angle of the light source unit 1 on one side.

Figure 2:
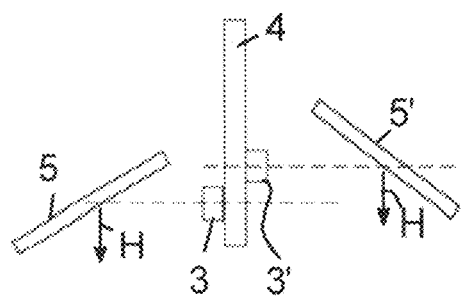
FIG. 2 shows a second embodiment of a lighting device from above that has a flat printed circuit board.

According to an alternative embodiment of the invention shown in FIG. 2, there is a first light source 3 on one side of the printed circuit board 4, and a second light source 3' on the other side, each of which are dedicated to different reflection hologram segments 5, 5'. The reflection hologram segments 5, 5' are placed on the printed circuit board 4 such that the light emitted from the light sources 3, 3' strikes the respective hologram segments 5, 5' at the acute angle φ and is reflected in the main beam direction H. Unlike in the embodiment shown in FIG. 1, the light sources 3, 3' are not in front of the reflection hologram segments 5, 5' in the main beam direction H, but to the side thereof.

Identical components and functions have the same reference symbols in the exemplary embodiments.

The printed circuit board 4 in the lighting device shown in FIG. 2 is flat.

Figure 3:
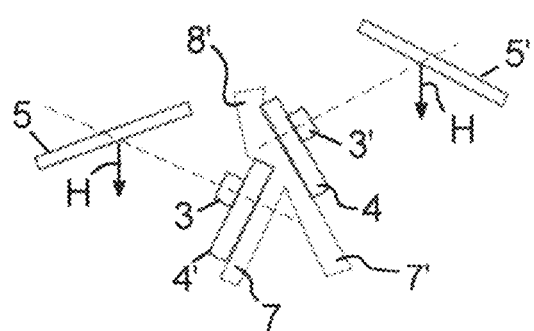
FIG. 3 shows a V-shaped printed circuit board from above according to another embodiment of the invention.

Another embodiment of the invention shown in FIG. 3 has a V-shaped printed circuit board substrate 8, on the outside of the first side 7 of which a printed circuit board 4 with a first light source 3 is placed, and on the outside of second side 7' of which a second printed circuit board 4 with a second light source 3' is placed. Consequently, the main axes of the light sources 3, 3' are not transverse to the main beam direction H, but instead are at an acute angle φ thereto, such that the reflection hologram segments 5, 5' can be placed in a space-saving manner behind the light sources 3, 3' in the main beam direction H.

Figure 4:
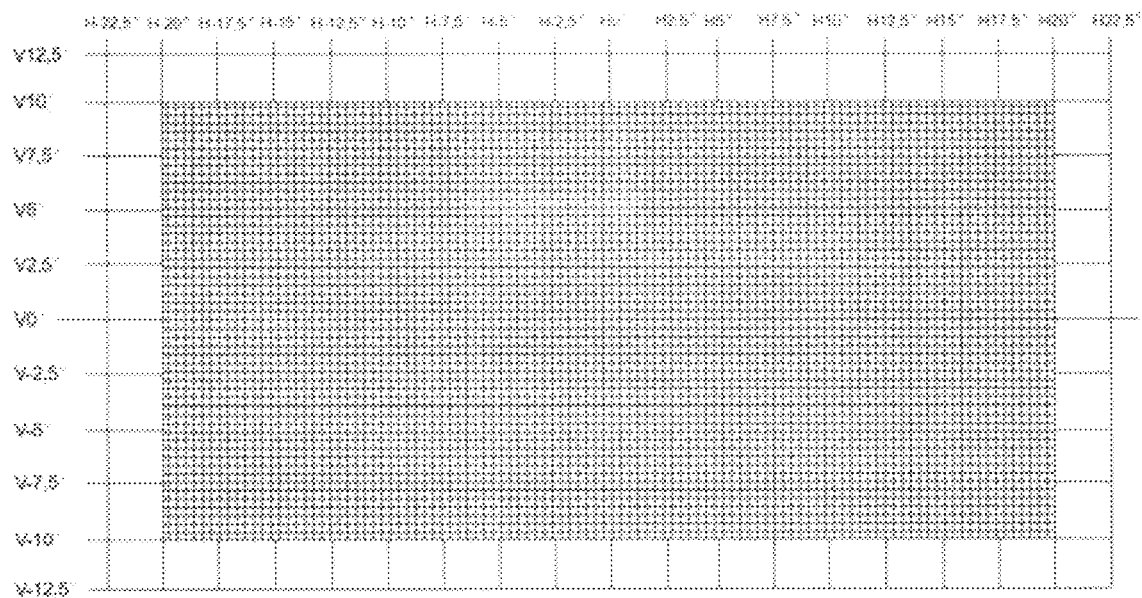
FIG. 4 shows a predefined area of a light distribution.
Figure 5:
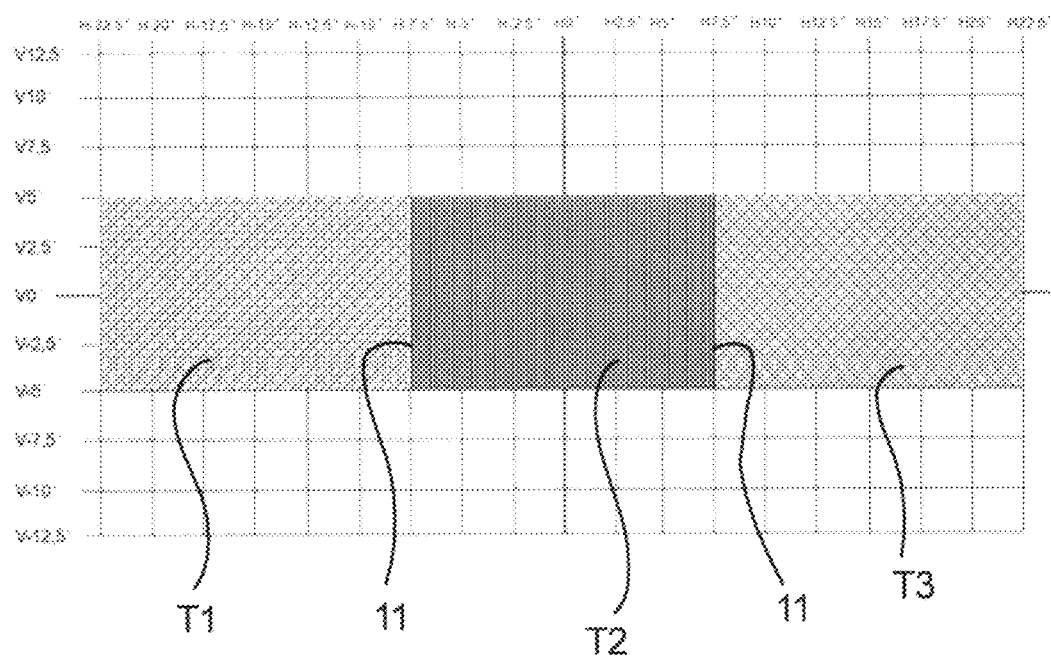
FIG. 5 shows a first part of a partial light distribution for generating the predefined light distribution.
Figure 6:
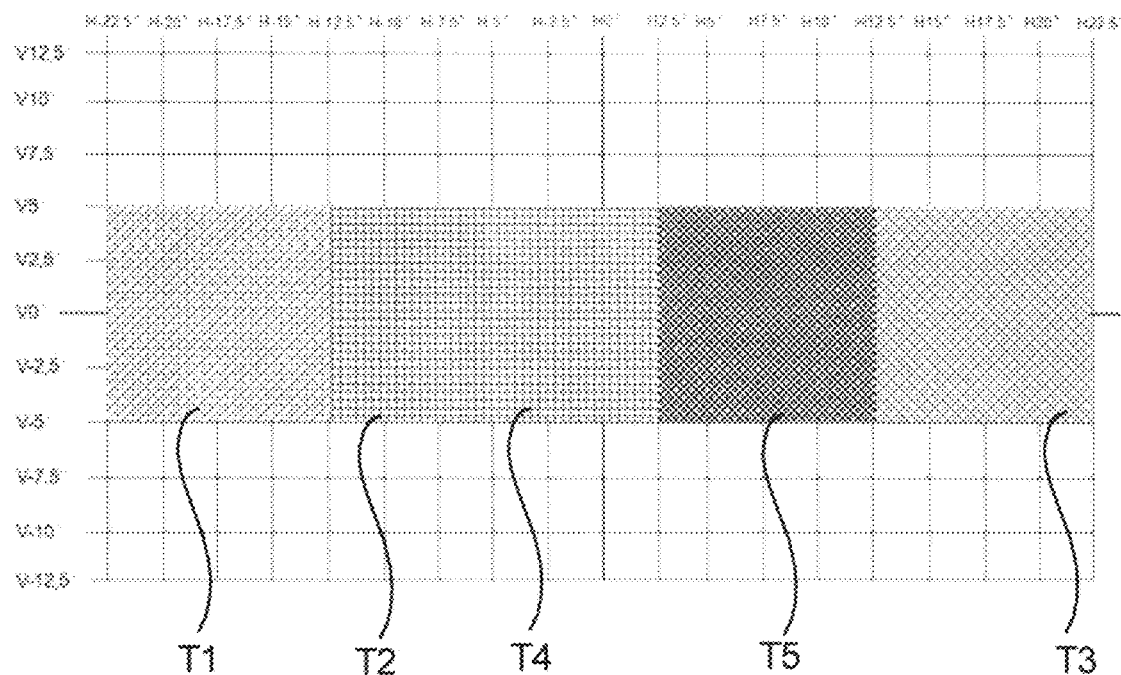
FIG. 6 shows the addition of two other partial light distributions, which overlap the partial light distributions shown in FIG. 5.
Figure 7:
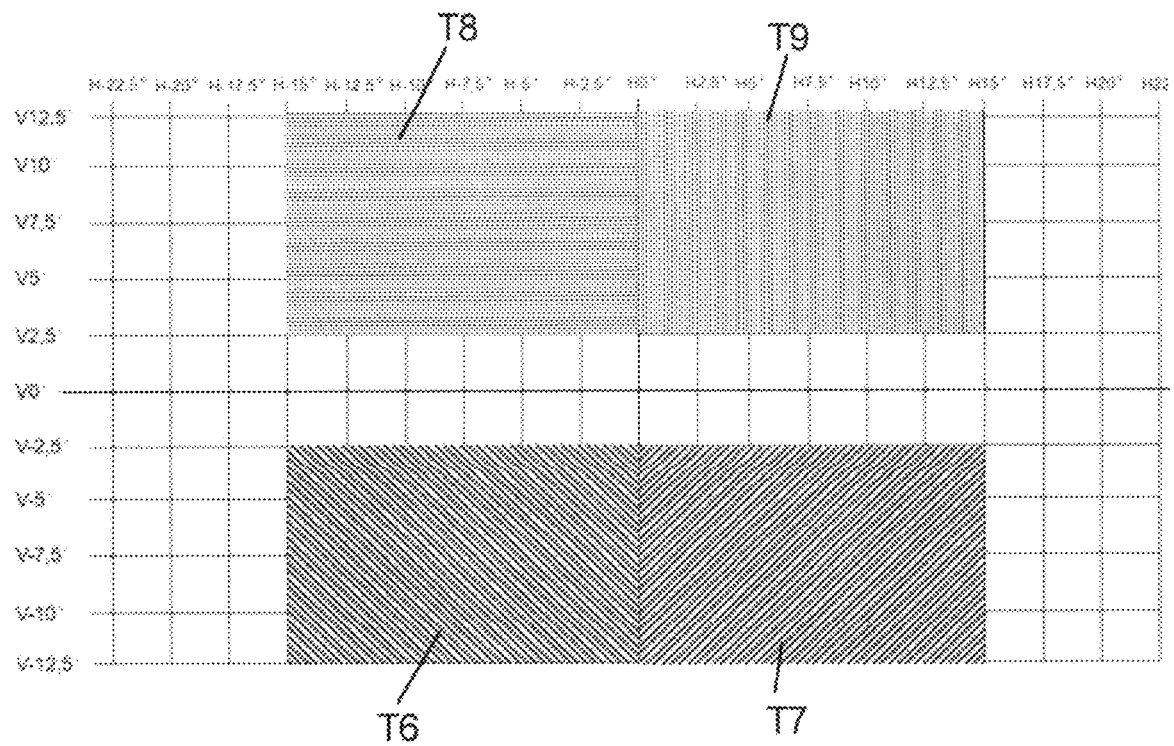
FIG. 7 shows two other partial light distributions in a relatively large vertical angular range.
Figure 8:
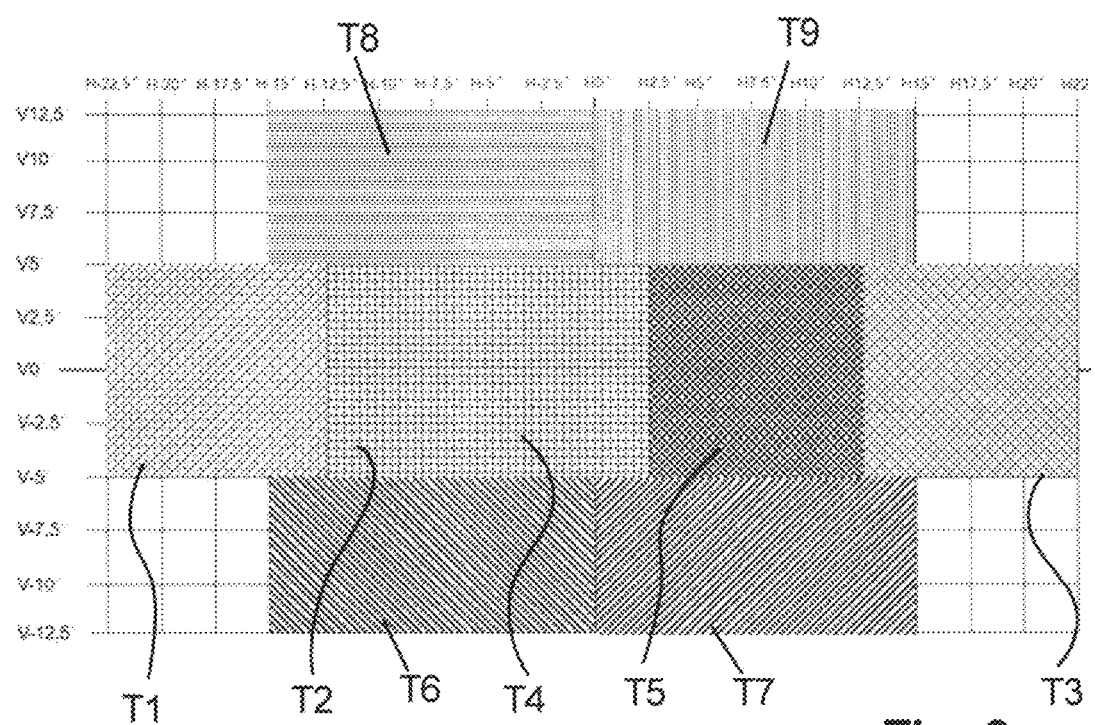
FIG. 8 shows a superimposing of the partial light distributions shown in FIG. 7 on the partial light distributions shown in FIG. 6, which have a smaller vertical deflection.

A light distribution for a signal function is shown in FIG. 4, which extends over a rectangular field. In this exemplary embodiment, the light distribution expands horizontally ±20° and vertically ±10°. The light distribution over this predefined angular range in FIG. 4 is formed according to the invention by combining superimposed partial light distributions that overlap one another. Partial light distributions T1, T2, T3 are generated by different reflection hologram segments in FIG. 5, which are the same size (horizontal angle of +7.5°, vertical angle of)+5°, and placed adjacently to one another horizontally. There are boundary lines 11 between partial light distributions T1, T2, T3. Two more partial light distributions T4, T5 are generated by other reflection hologram segments that are not shown, which each have the same vertical expansion of +5° but a smaller horizontal expansion than the partial light distributions T1, T2, T3, such that they overlap them. As shown in FIG. 7, further partial light distributions T6, T7, T8, T9 are generated by corresponding reflection hologram segments, which each have the same horizontal expansion of +7.5° and vertical expansion of +5°, but are offset vertically in pairs. The light distribution shown in FIG. 8 is obtained by superimposing all of these partial light distributions T1, T2, T3, T4, T5, T6, T7, T8, T9, when the reflection hologram segments 5, 5' that are responsible for these partial light distributions T1, T2, T3, T4, T5, T6, T7, T8, T9 are combined in segments to obtain the overall reflector. The reflection hologram segments are preferably connected integrally to one another.

Figure 9:
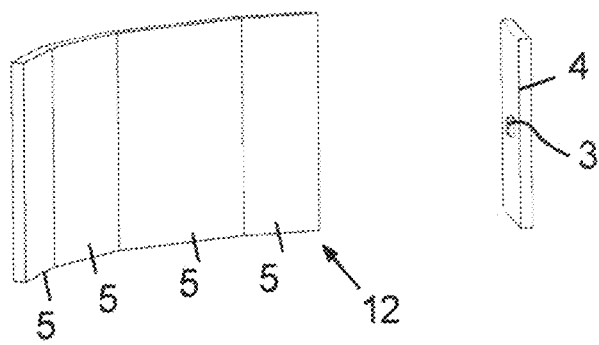
FIG. 9 shows a perspective view of a lighting device that has a hologram unit composed of flat reflection hologram segments with a single dedicated light source.
Figure 10:
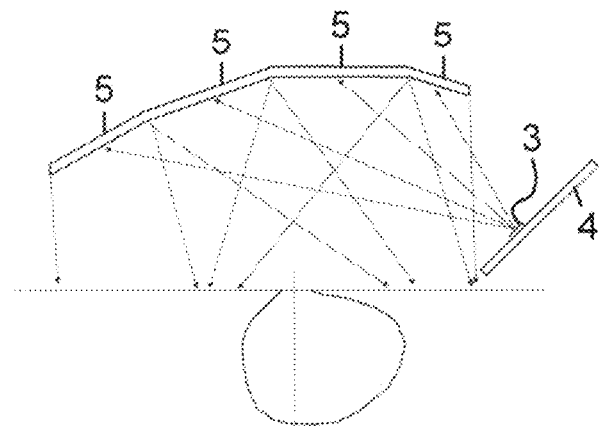
FIG. 10 shows an exemplary illustration of light beams from the lighting device shown in FIG. 9.

According to the embodiment of the lighting device shown in FIGS. 9 and 10, a hologram unit 2 is composed of an integral hologram reflector 12, which is composed of four flat reflection hologram segments 5. The hologram reflector 12 has a single dedicated light source 3 on a printed circuit board. The hologram reflector 12 is therefore faceted, and each of the reflection hologram segments 5 provides a different partial light distribution. These partial light distributions are superimposed to obtain the predefined light distribution. The superimposing of these partial light distributions can be overlapping and/or not overlapping.

Figure 11:
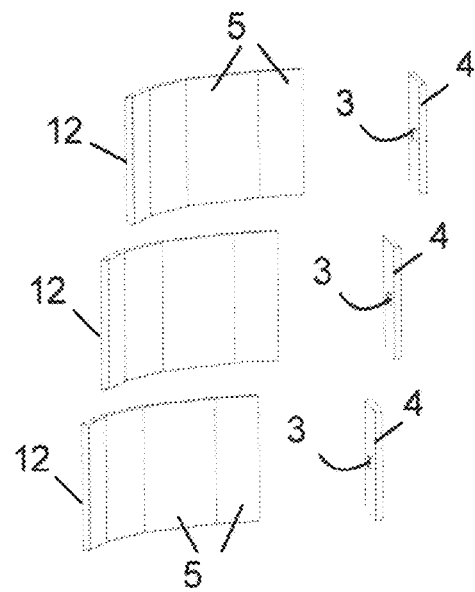
FIG. 11 shows another embodiment of the lighting device, which has numerous identical hologram units, shown in FIG. 9, and the single dedicated light sources.

If, for example, brake lights are to be brighter than tail lights, there can be three identical hologram reflectors 12, as is the case in the embodiment shown in FIG. 11, each of which has a single dedicated light source 3. The hologram reflectors 12 each generate the same light distributions.

Figure 12:
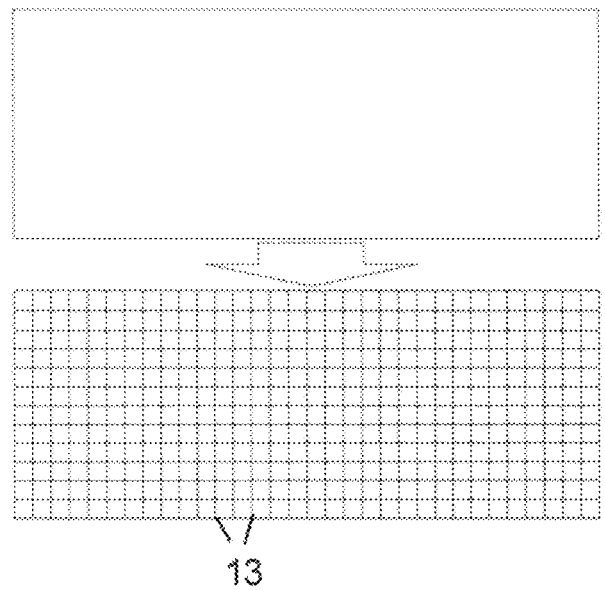
FIG. 12 shows a hologram segment composed of subsidiary hologram elements of the same size in comparison with a homogenous surface of a hologram segment.

According to another embodiment of the invention shown in FIG. 12, the hologram reflector 12, or the reflection hologram segment 5 can contain numerous subsidiary hologram elements 13 of preferably the same size, as shown in FIG. 12. These subsidiary hologram elements 13 are arranged in a matrix comprising rows and columns, and are the same size. Each subsidiary hologram element 13 reflects the light 6 from the light source 3 at a predefined angle, such that the light distribution forms a signal.

Numerous subsidiary hologram elements 13 have a dedicated light source 3, which does not need a primary optical element. Misalignment to the main axis of the light source 3 can be compensated for by the lighting and/or diffraction information contained in the respective subsidiary hologram elements 13.

If the beams of a light source 3 dedicated to an adjacent reflection hologram segment 5 strike another reflection hologram segment 5 composed of numerous subsidiary hologram elements 13, the individual subsidiary hologram elements 13 in the reflection hologram segment 5 contain compensation values for this.

The hologram reflectors 12, or the reflection hologram segments 5 can be placed on a flat or curved surface.

The size of the subsidiary hologram elements 13 is in the submillimeter range and/or the micrometer range. In this exemplary embodiment, the subsidiary hologram elements 13 are square, with a surface area of 0.7 mm×0.7 mm.

Figure 13:
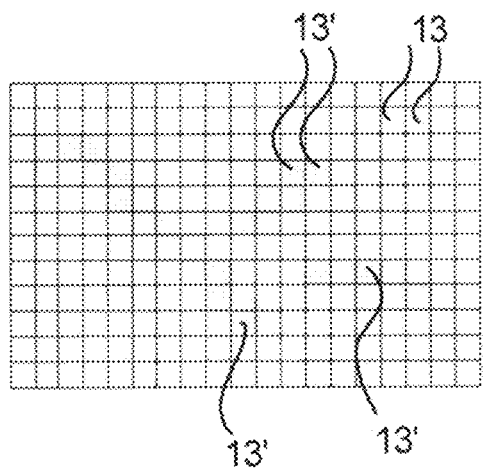
FIG. 13 shows an exemplary illustration of a hologram segment with dual lighting information for obtaining a graphic.

The hologram reflectors 12, or reflection hologram segments 5, are therefore pixelated, and in the simplest case each subsidiary hologram element 13 contains diffraction information causing it to either reflect or not reflect the light 6. The subsidiary hologram elements 13 therefore contain dual light information, such that they are either bright or dark. As can be seen from FIG. 13, such a hologram reflector 12 can be used to generate a light symbol, when the grey subsidiary hologram elements 13' in FIG. 13 do not reflect light 6, while the other subsidiary hologram elements 13 do reflect light. The subsidiary hologram elements 13' therefore form numerous continuous black lines.

Based on the lighting information in the subsidiary hologram elements 13, a symbol and/or an alphanumerical signal can be reflected onto a projection plane in the space inside or outside the lighting device, and displayed there, or displayed on the reflection hologram segment 5 itself, or the hologram reflector 12.

Figure 14:
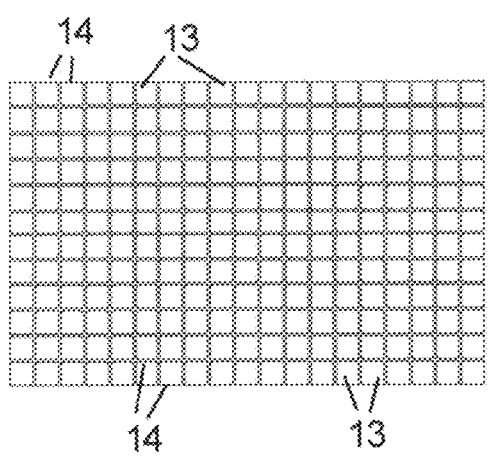
FIG. 14 shows a hologram segment in which the subsidiary hologram elements are spaced apart.

According to another embodiment of the invention shown in FIG. 14, the subsidiary hologram elements 13 can be spaced apart, such that a background grid 14 is formed. The space 14 between the subsidiary hologram elements 13 contains no lighting information and therefore no reflective properties, such that it always remains dark. This results in a dark background grid 14, in which the subsidiary hologram elements 13 can be bright or dark, depending on the lighting information. The subsidiary hologram elements 13 form a matrix or a grid on the surface of the hologram reflector 12, or the reflection hologram segment 5.

According to another embodiment of the invention, not shown in the drawings, the subsidiary hologram elements 13 contain diffraction information with which they can generate more than two different reflection levels. This makes it possible to generate light symbols with lower contrasts.

Figure 15:
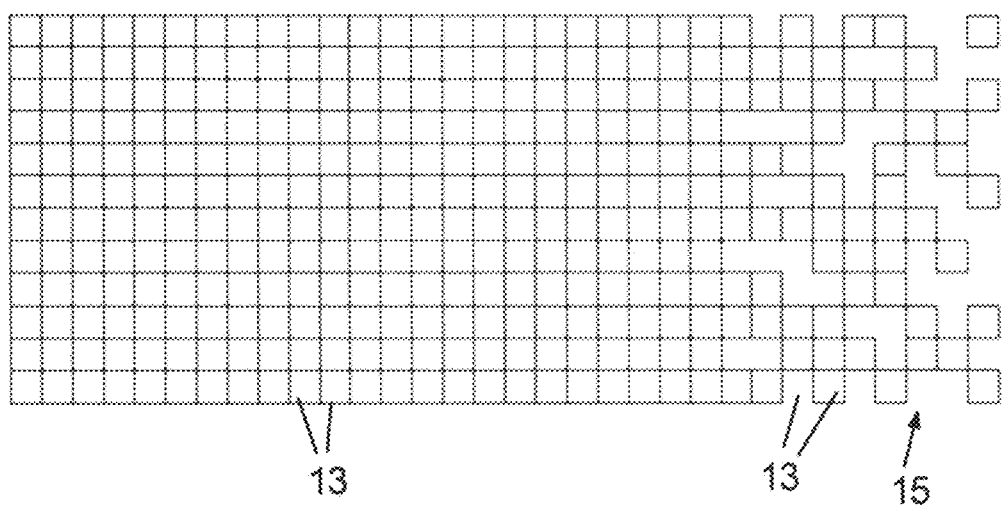
FIG. 15 shows a hologram segment in which adjacent subsidiary hologram elements at one edge are dimmed, such that the edge fades out.

According to another embodiment of the invention, shown in FIG. 15, the subsidiary hologram elements 13 can contain diffraction information or holographic information resulting in a dimming of the edges or an edge of the light distribution, such that the signal light function dims or fades out at the edge.

The numerous subsidiary hologram elements (13, 13') are directly adjacent to one another in a matrix in this case, i.e. without any empty space therebetween. One or more adjacent subsidiary hologram elements 13' that contain no holographic information are located near the edge 15 of the hologram reflector 12 or the reflection hologram segment 5, where no light is reflected. This results in a dimming or fading out of the light (6) at the edge of the reflection hologram segment 5 or hologram reflector 12, which affects the light distribution accordingly, if the subsidiary hologram elements 13 reflect the light toward different areas in the light distribution, which is composed of these different areas. The subsidiary hologram elements 13 and 13' preferably reflect or do not reflect light toward individual areas in the light distribution, which are also arranged in a matrix on a measurement screen.

Figures 16, 17:
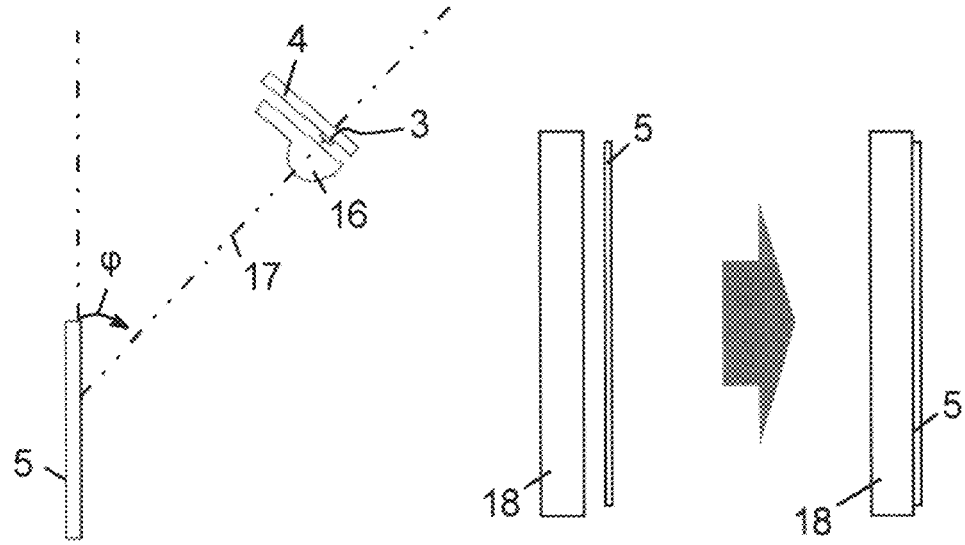
FIG. 16 shows a schematic illustration of a lighting device from above, with a focusing lens for the light source.
FIG. 17 shows a mount for the reflection hologram segment according to a first embodiment.

In another embodiment of the lighting device shown in FIG. 16, the light source unit 1 contains both the light source 3 and a focusing lens 16. This focusing lens 16 focuses the light emitted by the light source 3 onto the surface of the reflection hologram element 5. An optical axis 17 of the focusing lens 16 intersects the plane of extension for the reflection hologram segment 5 at an acute angle φ of 20° to 70°, in the exemplary embodiment shown in FIG. 16 at an angle ¢ of 45°.

As can be seen from the embodiment shown in FIGS. 19 to 23, the focusing lens 16 for the light source 3 can be used to compensate for differences in the main axes $H_L$ of the light sources, which are at acute angles to one another, and the main axes $H_R$ of the reflection hologram segments 5. The light sources 3 can be placed on the flat printed circuit board 4, and the focusing lens 16 can direct the light 6 from the light sources 3 such that all of it strikes the reflection hologram segment 5. It can be seen from FIGS. 21 to 23 that each reflection hologram segment 5 is lit by the light 6 from the same dedicated light source 3.

It can be seen in FIG. 17 that the reflection hologram segment 5 can be glued, laminated, or bonded a substrate 18. Alternatively, the reflection hologram segment 5 can be molded to the back thereof.

The reflection hologram segment 5 is preferably a hologram film. If the substrate 18 is black instead of transparent, the lighting device has a black-panel appearance. This means that the lighting device appears to be dark when it is not on.

Figure 18:
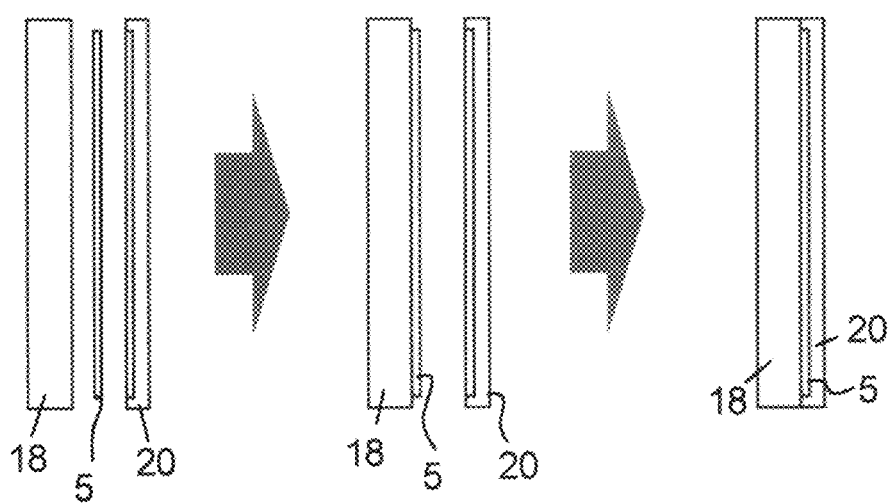
FIG. 18 shows a mount for the reflection hologram segment according to a first embodiment.
Figure 19:
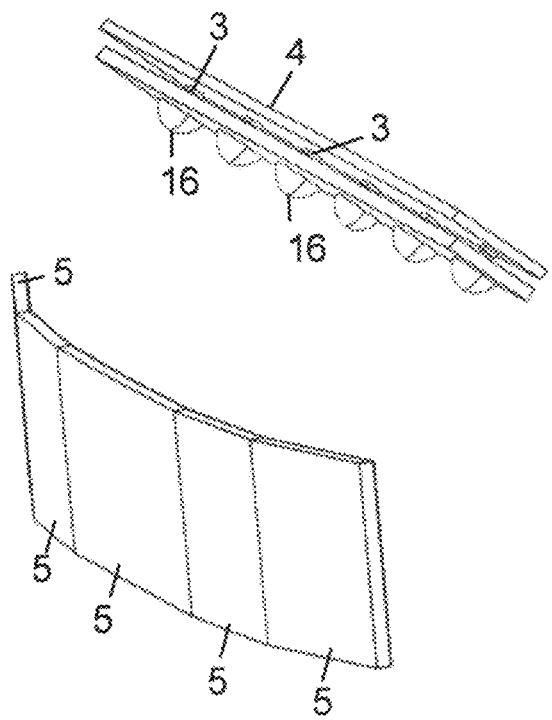
FIG. 19 shows a perspective view of a lighting device that has numerous light sources on a single, flat printed circuit board.
Figure 20:
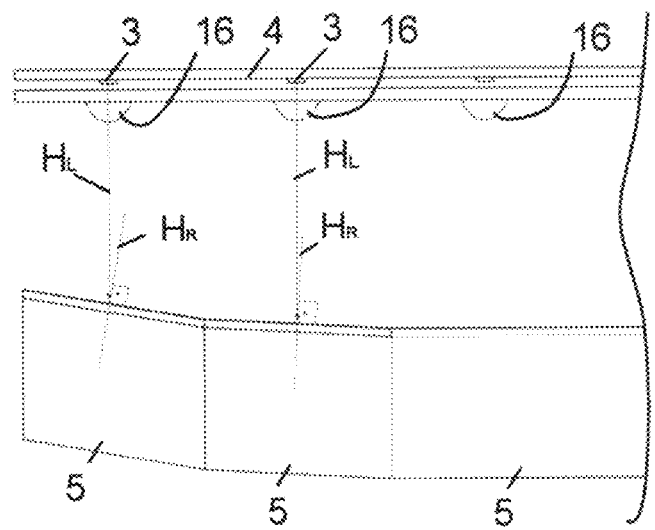
FIG. 20 shows the lighting device in FIG. 20 from above.
Figure 21:
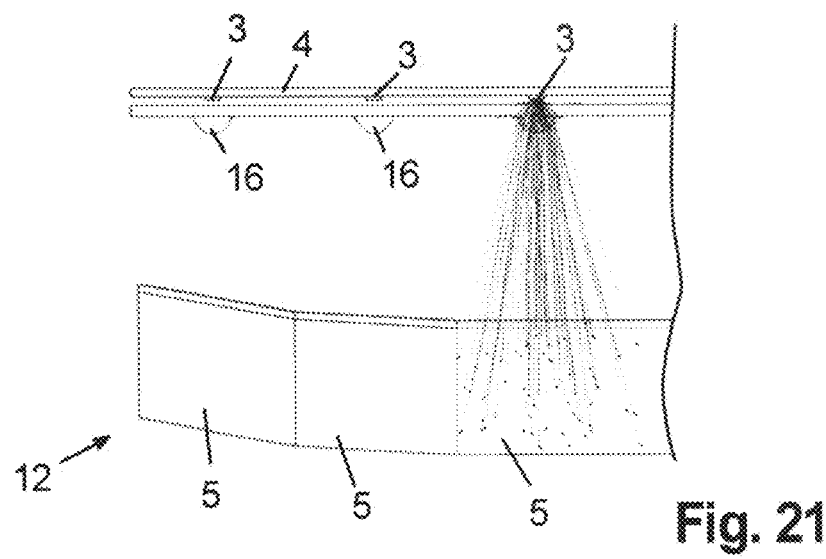
FIG. 21 shows the lighting device in FIG. 20, in which the light beams from a first light source are illustrated.
Figure 22:
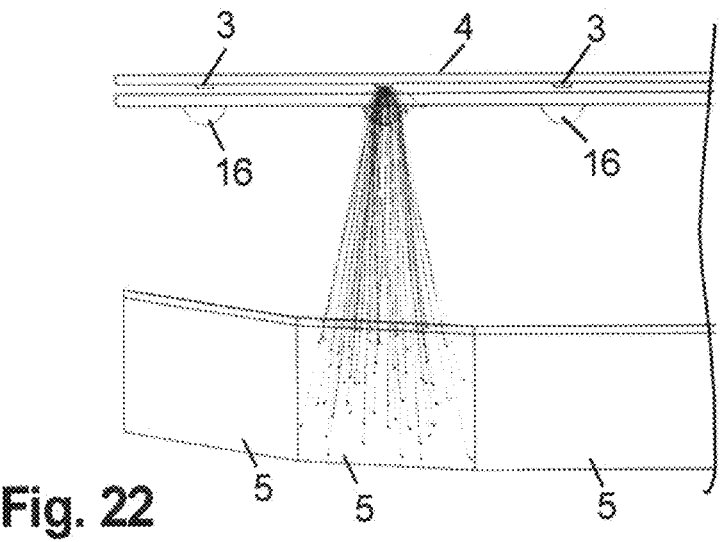
FIG. 22 shows the lighting device in FIG. 20 in which the light beams from a second light source are illustrated.
Figure 23:
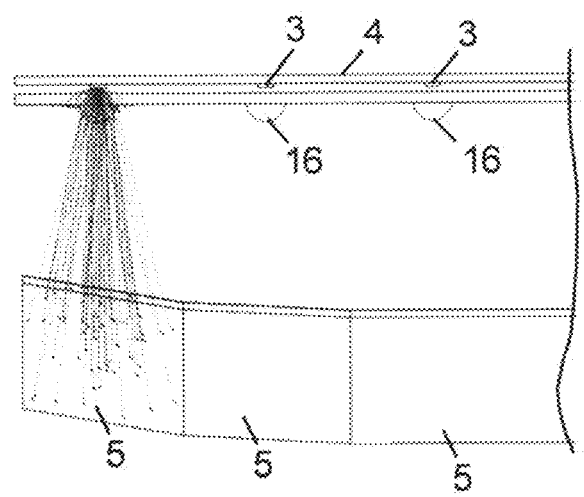
FIG. 23 shows the lighting device in FIG. 20 in which the light beams from a third light source are illustrated.

According to another alternative mounting variation for the reflection hologram segment 5, shown in FIG. 18, the hologram film 5 is protected in a housing 19, which is made of the substrate 18 and a cover plate 20. The hologram film 5 can be laminated or secured to the substrate 18. The substrate 18 can be produced in an injection molding process, and colored black. The cover plate 20 is obtained in a second injection molding process. The cover plate 20 is preferably formed on the inner surface of substrate 18 while the hologram film 5 is held in place thereon.

The substrate 18 is preferably composed of a transparent, black, or white plastic, or a plastic of any color. The front of the cover plate 20 preferably has an antireflective structure or coating. The front of the cover plate 20 is on the side facing away from the reflection hologram segment 5.

The light sources 3, 3' are preferably LEDs.

LIST OF REFERENCE SYMBOLS

- 1 Light source unit
- 2 hologram unit
- 3, 3' light sources
- 4 printed circuit board
- 5, 5' reflection hologram segments
- 6 light
- 7, 7' side
- 8 printed circuit board substrate
- 10 screen
- 11 boundary lines
- 12 hologram reflector
- 13, 13', 13" subsidiary hologram elements
- 14 background grid
- 15 edge
- 16 focusing lens
- 17 optical axis
- 18 substrate
- 19 housing
- 20 cover plate
- H main beam direction
- φ angle
- T1-T9 partial light distributions
- $H_L$, $H_R$ Main axes

The invention claimed is:

1. A lighting device for vehicles, the lighting device comprising:
   a light source unit comprising light sources positioned on a printed circuit board; and
   a hologram unit comprising hologram segments for generating a predefined light distribution,
   wherein the hologram segments are reflection hologram segments positioned behind and/or adjacent to the light source unit in a main beam direction (H) of the lighting device, such that light emitted from the light sources strikes the reflection hologram segments at an acute angle (φ),
   wherein holographic diffraction information for generating a signal light distribution is stored in the reflection hologram segments,
   wherein the light source unit comprises a single printed circuit board or a single printed circuit board substrate, and
   wherein the printed circuit board is between at least two of the reflection hologram segments, the printed circuit board having two sides, each side of the printed circuit board including at least one of the light sources positioned thereon.

2. The lighting device according to claim 1, wherein the printed circuit board is a single printed circuit board aligned with the main beam direction (H).

3. The lighting device according to claim 1, wherein the reflection hologram segments each contain diffraction information with which partial light distributions are obtained from which the predefined light distribution is generated, wherein adjacent partial light distributions overlap and form the signal light distribution.

4. The lighting device according to claim 1, wherein the hologram unit comprises a hologram reflector comprising multiple of the reflection hologram segments arranged in different directions,
   wherein adjacent reflection hologram segments of the hologram reflector meet at an obtuse angle, and
   wherein the hologram reflector has a single dedicated light source of the light sources for generating a partial light distribution, or for generating the signal light distribution.

5. The lighting device according to claim 1, further comprising multiple hologram reflectors, each of the hologram reflectors having a dedicated light source of the light sources, each of the hologram reflectors comprising multiple of the reflection hologram segments,
   wherein the hologram reflectors and the dedicated light sources are spaced apart from one another,
   wherein each of the hologram reflectors and/or the reflection hologram segments of each of the hologram reflectors contain diffraction information for generating a different partial light distribution, wherein the predefined light distribution is obtained by superimposing the different partial light distributions.

6. The lighting device according to claim 1, wherein the reflection hologram segments, or hologram reflectors of the hologram unit comprising the reflection hologram segments, comprise subsidiary hologram elements, each subsidiary hologram element containing diffraction information, such that light is reflected from the subsidiary hologram elements in a desired and predefined angular range, and the signal light distribution for a signal function is obtained.

7. The lighting device according to claim 6, wherein the subsidiary hologram elements are formed such that a symbol and/or alphanumerical signal is reflected onto a projection surface in a space inside or outside the lighting device, or is displayed on the reflection hologram segments or the hologram reflectors.

8. The lighting device according to claim 6, wherein sizes of subsidiary hologram elements are in the submillimeter range or micrometer range.

9. The lighting device according to claim 6, wherein the subsidiary hologram elements are directly adjacent to one another, or spaced apart from one another, and are arranged in a matrix on the surfaces of the hologram reflectors or the reflection hologram segments.

10. The lighting device according to claim 6, wherein the subsidiary hologram elements are directly adjacent to one another and one or more adjacent subsidiary hologram elements that contain no holographic information are located at an edge of the hologram reflectors or the reflection hologram segments, such that no reflection takes place the edges and the light is faded out or dimmed at the edges of the reflection hologram segments or the hologram reflectors.

11. The lighting device according to claim 6, wherein the subsidiary hologram elements are of the same size.

12. The lighting device according to claim 1, wherein multiple light sources of the light sources are positioned on a single, flat, printed circuit board, each of the multiple light sources having a dedicated reflection hologram segment of the reflection hologram segments, and each of the multiple light sources having a focusing lens that focuses the light from the respective light source onto a surface of the dedicated reflection hologram segment, wherein a difference in angles of main axes (HL) of the multiple light sources and main axes (HR) of the dedicated reflection hologram segments is compensated for.

13. The lighting device according to claim 1, wherein the reflection hologram segments are glued, laminated, or bonded onto a substrate, or molded onto a back thereof.

14. The lighting device according to claim 1, wherein the reflection hologram segments are in a housing, wherein the housing contains a substrate and a transparent cover plate, wherein the transparent cover plate is formed in an injection molding process on the substrate and the reflection hologram segment.

15. The lighting device according to claim 1, wherein the reflection hologram segments are in a housing, wherein the housing contains a substrate and a transparent cover plate, wherein the substrate is made of a transparent, black, or white plastic, or a plastic of any color, and a front surface of the cover plate is coatable with an antireflective structure or layer.

16. A lighting device for vehicles, the lighting device comprising:
 a light source unit comprising light sources;
 a single printed circuit board substrate, each side of the printed circuit board substrate including at least one of the light sources; and
 a hologram unit comprising hologram segments for generating a predefined light distribution,
 wherein the hologram segments are reflection hologram segments positioned behind and/or adjacent to the light source unit in a main beam direction (H) of the lighting device, such that light emitted from the light sources strikes the reflection hologram segments at an acute angle ($\varphi$),
 wherein holographic diffraction information for generating a signal light distribution is stored in the reflection hologram segments,
 wherein the printed circuit board substrate is between at least two of the reflection hologram segments.

17. The lighting device according to claim 16, wherein the printed circuit board substrate is V-shaped and the sides of the printed circuit board substrate converge at an acute angle.

18. The lighting device according to claim 16, further comprising a first printed circuit board including at least one of the light sources and a second printed circuit board including at least another one of the light sources, wherein each of the first printed circuit board and the second printed circuit board is attached to an outside of one of the sides of the printed circuit board substrate.

19. The lighting device according to claim 18, wherein the first printed circuit board and the second printed circuit board are each oriented at an angle relative to the main beam direction (H).

20. The lighting device according to claim 16, wherein the printed circuit board substrate includes a single printed circuit board defining the sides of the printed circuit board substrate.

\* \* \* \* \*